United States Patent
Joo et al.

(10) Patent No.: US 11,425,630 B2
(45) Date of Patent: Aug. 23, 2022

(54) ELECTRONIC DEVICE SUPPORTING DEVICE TO DEVICE COMMUNICATION AND METHOD THEREOF

(71) Applicant: Samsung Electronics Co., Ltd., Suwon-si (KR)

(72) Inventors: Yusung Joo, Suwon-si (KR); Jaejun Lee, Suwon-si (KR); Jaesung Park, Suwon-si (KR); Wonshik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/147,042

(22) Filed: Jan. 12, 2021

(65) Prior Publication Data
US 2021/0219208 A1 Jul. 15, 2021

(30) Foreign Application Priority Data
Jan. 15, 2020 (KR) .......... 10-2020-0005275

(51) Int. Cl.
| | |
|---|---|
| *H04W 48/10* | (2009.01) |
| *H04W 4/70* | (2018.01) |
| *H04W 48/02* | (2009.01) |
| *H04W 48/16* | (2009.01) |

(52) U.S. Cl.
CPC .......... *H04W 48/10* (2013.01); *H04W 4/70* (2018.02); *H04W 48/02* (2013.01); *H04W 48/16* (2013.01)

(58) Field of Classification Search
None
See application file for complete search history.

(56) References Cited

U.S. PATENT DOCUMENTS

| 10,485,044 B2* | 11/2019 | Fujishiro | H04L 47/40 |
| 2014/0177466 A1* | 6/2014 | Inoue | H04L 5/0048 370/252 |
| 2015/0271856 A1* | 9/2015 | Tong | H04W 16/26 455/552.1 |
| 2017/0078865 A1* | 3/2017 | Santhanam | H04L 5/001 |
| 2018/0206180 A1 | 7/2018 | Agiwal et al. | |

FOREIGN PATENT DOCUMENTS

KR 10-2016-0115699 A 10/2016

* cited by examiner

*Primary Examiner* — Hong S Cho
(74) *Attorney, Agent, or Firm* — Jefferson IP Law, LLP

(57) ABSTRACT

An electronic device is provided. The electronic device includes a display, a communication circuit, a memory, and a processor. The processor is configured to receive first system information broadcast from a base station using the communication circuit, connect to a cell associated with the base station based on the first system information using the communication circuit, and trigger, based on a frequency band of the cell and radio resource information about the cell, a first event indicating that device-to-device communication is possible or a second event indicating that the device-to-device communication is impossible.

16 Claims, 6 Drawing Sheets

ELECTRONIC DEVICE SUPPORTING DEVICE TO DEVICE COMMUNICATION AND METHOD THEREOF

CROSS-REFERENCE TO RELATED APPLICATION(S)

This application is based on and claims priority under 35 U.S.C. § 119(a) of a Korean patent application number 10-2020-0005275, filed on Jan. 15, 2020, in the Korean Intellectual Property Office, the disclosure of which is incorporated by reference herein in its entirety.

BACKGROUND

1. Field

The disclosure relates to an electronic device supporting device-to-device (D2D) communication and a method thereof.

2. Description of Related Art

In a cellular network, an electronic device may communicate with another electronic device via a base station. The base station may allocate radio resources for wireless data transmission/reception to each of a plurality of electronic devices within a cell, and may control communication of each of the plurality of electronic devices. In the case of a cellular network, a signal transmitted from one electronic device within a cell may interfere with other electronic devices. Therefore, in order to coordinate such interference, the base station may maximize frequency efficiency of the cell by controlling signal transmission/reception of electronic devices within the cell.

Researches are carried out with respect to various methods of device-to-device (D2D) communication. For example, in the case of a cellular network, the 3rd Generation Partnership Project (3GPP), which is a standard organization, supports device-to-device communication with a technique referred to as sidelink. The necessity of such device-to-device communication is expected to increase in special situations, such as catastrophic situations that cause massive group communication or situations in which public safety is required to be secured. Researches are carried out with respect to mission critical push-to-talk (MCPTT) related to communication for such special purposes.

The above information is presented as background information only to assist with an understanding of the disclosure. No determination has been made, and no assertion is made, as to whether any of the above might be applicable as prior art with regard to the disclosure.

SUMMARY

According to standardization of a device-to-device communication standard, such as Sidelink, various electronic devices that support a cellular network may perform device-to-device communication. However, device-to-device communication in a cellular network is a newly introduced service, and does not sufficiently consider various communication environments in which electronic devices may experience. In addition, operation of an electronic device for device-to-device communication in such various communication environments is not sufficiently defined.

For example, a signal used by an electronic device for device-to-device communication may cause signal interference to a surrounding cellular network. In addition, the interference may bring about a situation where device-to-device communication is substantially impossible. In this case, a user may experience inconvenience if an electronic device continuously attempts to perform device-to-device communication. Furthermore, when a communication processor for a cellular network is used, communication through a base station may not be supported due to device-to-device communication contrary to user's intent.

Aspects of the disclosure are to address at least the above-mentioned problems and/or disadvantages and to provide at least the advantages described below. Accordingly, an aspect of the disclosure is to provide a mobile communication device including a display, a communication circuit, a memory, and a processor operatively connected to the display, the communication circuit, and the memory, wherein the processor is configured to receive first system information broadcast from a base station using the communication circuit, connect to a cell associated with the base station based on the first system information using the communication circuit, and trigger, based on a frequency band of the cell and radio resource information about the cell, a first event indicating that device-to-device communication is possible or a second event indicating that the device-to-device communication is impossible.

Another aspect of the disclosure is to provide a method for providing device-to-device communication of a mobile communication device, the method including attempting to receive first system information broadcast from a base station, connecting to a cell associated with the base station based on the first system information when the first system information is received, and triggering, based on a frequency band of the cell and radio resource information about the cell, a first event indicating that device-to-device communication is possible or a second event indicating that the device-to-device communication is impossible.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
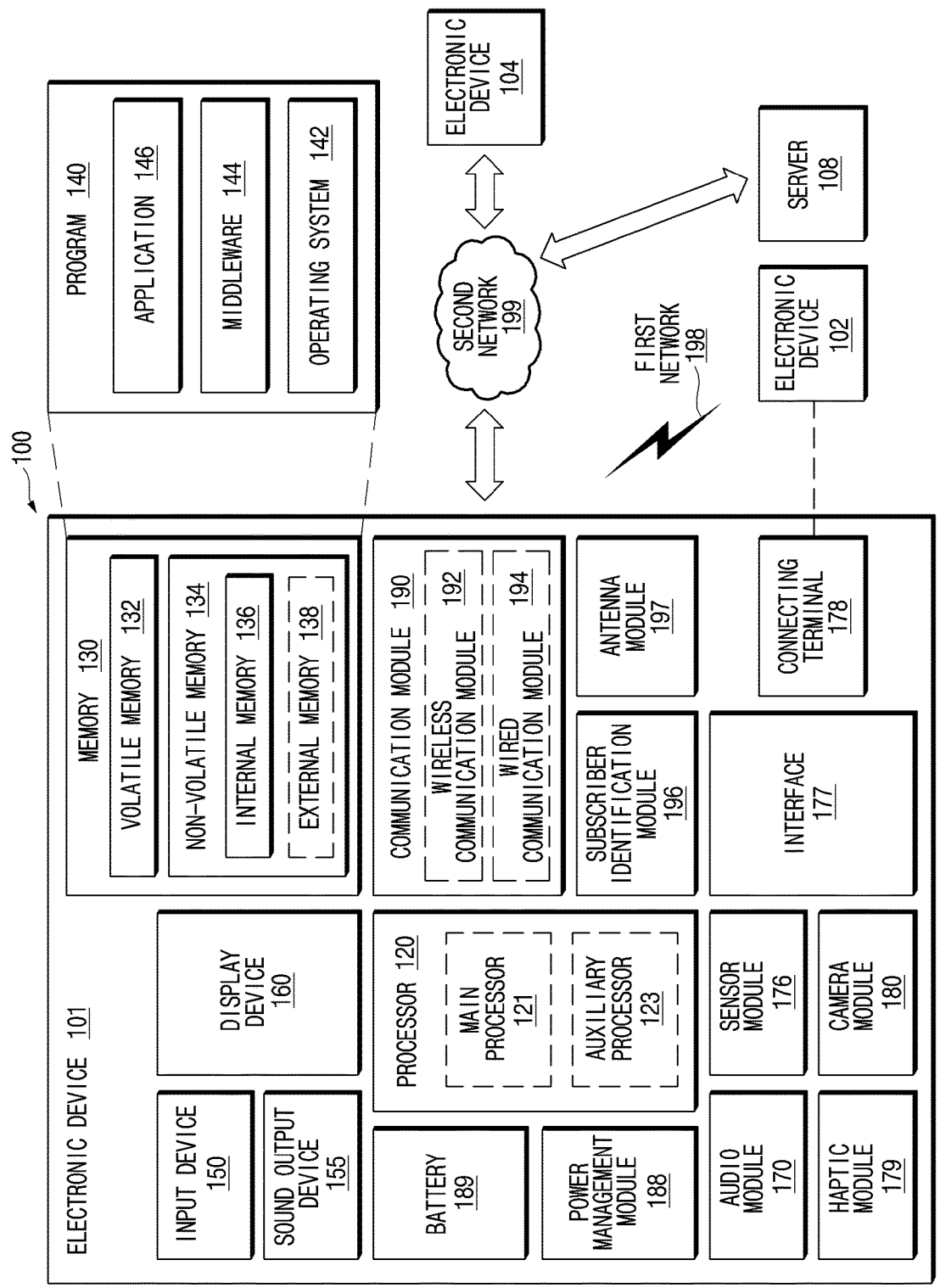
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
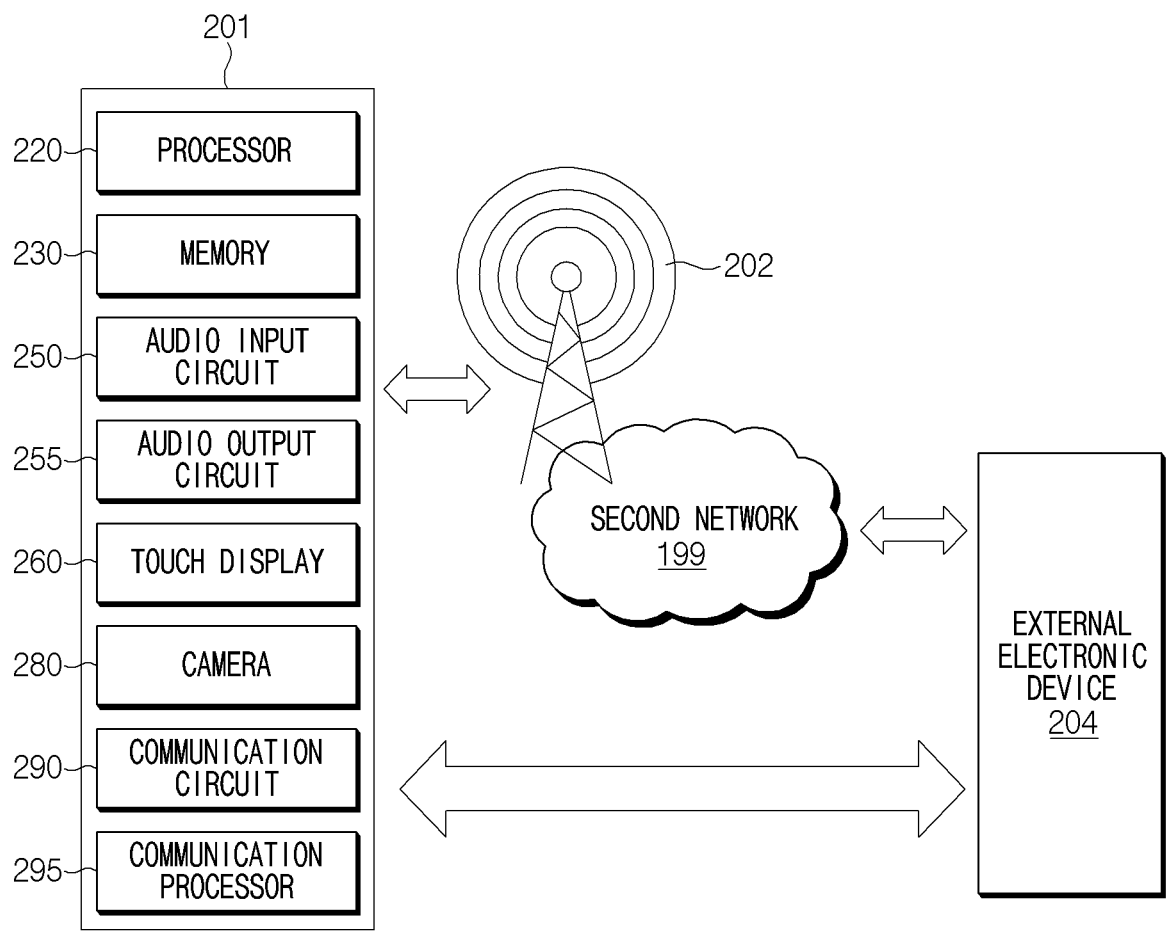
FIG. 2 illustrates an environment of communication of an electronic device with an external electronic device according to an embodiment of the disclosure.

FIG. 2 illustrates an environment of communication of an electronic device 201 with an external electronic device 204 according to an embodiment of the disclosure.

Referring to FIG. 2, an electronic device 201 (e.g., the electronic device 101 of FIG. 1) may include a processor 220 (e.g., the processor 120 of FIG. 1 (e.g., an application processor)), a memory 230 (e.g., the memory 130 of FIG. 1), an audio input circuit 250 (e.g., the input device 150 of FIG. 1), an audio output circuit 255 (e.g., the sound output device 155 of FIG. 1), a touch display 260 (e.g., the display device 160 of FIG. 1), a camera 280 (e.g., the camera module 180 of FIG. 1), a communication circuit 290 (e.g., the communication module 190 of FIG. 1), and/or a communication processor 295 (e.g., the auxiliary processor 123 of FIG. 1). The configuration of the electronic device 201 illustrated in FIG. 2 is exemplary, and embodiments of the disclosure are not limited thereto. For example, the electronic device 201 may not include at least one of the components illustrated in FIG. 2. For another example, the electronic device 201 may further include a component not illustrated in FIG. 2.

According to an embodiment of the disclosure, the processor 220 may be operatively connected to the memory 230, the touch display 260, and/or the communication circuit 290. The processor 220 may control the components of the electronic device 201. For example, the processor 220 may control the components of the electronic device 201 according to one or more instructions stored in the memory 230. The processor 220 may include an application processor and/or a communication processor. The processor 220 may be configured with a single chip or a plurality of chips.

According to an embodiment of the disclosure, the touch display 260 may display an image and receive a touch input. For example, the touch display 260 may include a plurality of pixels that emit light. The processor 220 may display an image using at least a portion of the pixels of the touch display 260. The touch display 260 may include a touch sensing layer for sensing a touch input. The touch display 260 may transfer obtained information about a touch input to the processor 220.

According to an embodiment of the disclosure, the communication circuit 290 may provide communication with the external electronic device 204 (e.g., the external electronic device 102 or the external electronic device 104 of FIG. 1) to the electronic device 201. For example, the communication circuit 290 may be configured to communicate with the external electronic device 204 via the second network 199 (e.g., a cellular network). For another example, the communication circuit 290 may be configured to communicate with the external electronic device 204 based on device-to-device communication (e.g., sidelink communication). For example, the second network 199 may include a base station 202.

Hereinafter, various device-to-device communication methods for the electronic device 201 will be described. Device-to-device communication may be referred to as D2D communication, vehicle-to-vehicle (V2V) communication, or sidelink communication.

According to an embodiment of the disclosure, the electronic device 201 may perform device-to-device communication with supports from the base station 202. For example, the electronic device 201 may be allocated with a radio resource (e.g., a frequency and/or communication time) from the base station 202, and may perform device-to-device communication with the external electronic device 204 using the allocated radio resource. For another example, the electronic device 201 itself may select a radio resource for device-to-device communication, and may perform device-to-device communication with the external electronic device 204 using the selected radio resource. For another example, the electronic device 201 may receive radio resource information for device-to-device communication from the base station 202, may select a radio resource for device-to-device communication from the received radio resource information, and may perform device-to-device communication with the external electronic device 204 using the selected radio resource.

Although FIG. 2 illustrates that the electronic device 201 directly performs device-to-device communication with the external electronic device 204, embodiments of the disclosure are not limited thereto. For example, the electronic device 201 may perform device-to-device communication with the external electronic device 204 via at least one relay device (not shown).

According to an embodiment of the disclosure, the electronic device 201 may use a public land mobile network (PLMN) identifier to determine availability of device-to-device communication. For example, the electronic device 201 may determine the availability of device-to-device communication by determining whether a PLMN identifier received from the base station 202 corresponds to a device-to-device communication supporting PLMN identifier stored in the memory 230.

According to an embodiment of the disclosure, the electronic device 201 may determine the availability of device-to-device communication further based on a radio resource of a detected cell. For example, the electronic device 201 may determine whether a radio frequency band used by a cell of the base station 202 includes a frequency band for device-to-device communication. The electronic device 201 may determine, based on system information about a cell, whether the electronic device 201 has camped on a cell that supports device-to-device communication (e.g., a cell using a frequency band that supports device-to-device communication). When the electronic device 201 has camped on a cell that supports device-to-device communication, the electronic device 201 may determine that device-to-device communication is not available since a radio frequency band used by the cell is a band for device-to-device communication. When the electronic device 201 has camped on a cell that supports device-to-device communication, the electronic device 201 may determine whether system information (e.g., SIB 18 and/or SIB 19) including usage information about device-to-device communication is present. If the system information including the usage information about device-to-device communication is received, the electronic device 201 may determine that device-to-device communication is available. On the contrary, if the system information including the usage information about device-to-device communication is not received although the electronic device 201 is connected to a cell that supports device-to-device communication, the electronic device 201 may determine that device-to-device communication is not available. For example, even when the electronic device has received the system information including the usage information about device-to-device communication, the electronic device 201 may determine that device-to-device communication is not available if the system information does not include resource information for device-to-device communication.

When the electronic device 201 is in a shadow area, the electronic device 201 may determine the availability of device-to-device communication based on whether a frequency band for device-to-device communication is a barring band. For example, the electronic device 201 may determine whether a cell corresponding to a band for device-to-device communication is a barring cell based on received information about an adjacent cell. If the corresponding cell is not a barring cell, the electronic device 201 may determine that device-to-device communication is available.

The electronic device 201 may determine the availability of device-to-device communication further based on preference information (e.g., service priority operation mode). For example, the preference information may include priority information about device-to-device communication set by a user.

When the electronic device 201 is located in a region in which device-to-device communication is available, the electronic device 201 may determine the availability of device-to-device communication based on the preference information. The electronic device 201 may be set to an operation mode in which a device-to-device communication service is supported, and only an on-network service (e.g., a cellular network service except for device-to-device communication) is used. In this case, the electronic device 201 may maintain an on-network state in a device-to-device communication supporting or non-supporting network, and may not perform a service through any cellular network in a shadow area.

The electronic device 201 may be configured to perform an on-network service until the on-network service becomes unavailable in a region in which a device-to-device communication service is available, and perform device-to-device communication only when entering a shadow area. In this case, the electronic device 201 may maintain an on-network state in a device-to-device communication supporting or non-supporting network, and may determine that device-to-device communication is available in a shadow area.

The electronic device 201 may be configured to preferentially use device-to-device communication in a region in which a device-to-device communication service is available. In this case, the electronic device 201 may determine that device-to-device communication is available in a device-to-device communication supporting network, a device-to-device communication non-supporting network, or a shadow area. Furthermore, the electronic device 201 may determine that device-to-device communication and an on-network service are simultaneously available in a device-to-device communication supporting network.

The electronic device 201 may be configured to use only a device-to-device communication service. In this case, the electronic device 201 may determine that device-to-device communication is available in a device-to-device communication supporting network, a device-to-device communication non-supporting network, or a shadow area.

According to an embodiment of the disclosure, the electronic device 201 may automatically change or maintain an operation mode (e.g., a device-to-device communication mode) based on the availability of device-to-device communication. When device-to-device communication is available and provision of device-to-device communication is determined based on the preference information, the electronic device 201 may change the operation mode to a mode for device-to-device communication.

The electronic device 201 may provide, to the user, information about the availability of device-to-device communication. For example, the electronic device 201 may provide the information about the availability of device-to-device communication via the touch display 260. For example, the electronic device 201 may provide the information about the availability when executing an application for device-to-device communication stored in the memory 230, when the availability of device-to-device communication is changed after executing an application, and/or when performing a service for device-to-device communication (e.g., device-to-device discovery, device-to-device communication and/or relay).

Hereinafter, operations of the electronic device 201 for performing device-to-device communication will be described with reference to FIGS. 3 to 6. The various embodiments described below may be combined with the operations of the electronic device 201 described above with reference to FIG. 2.

Figure 3:
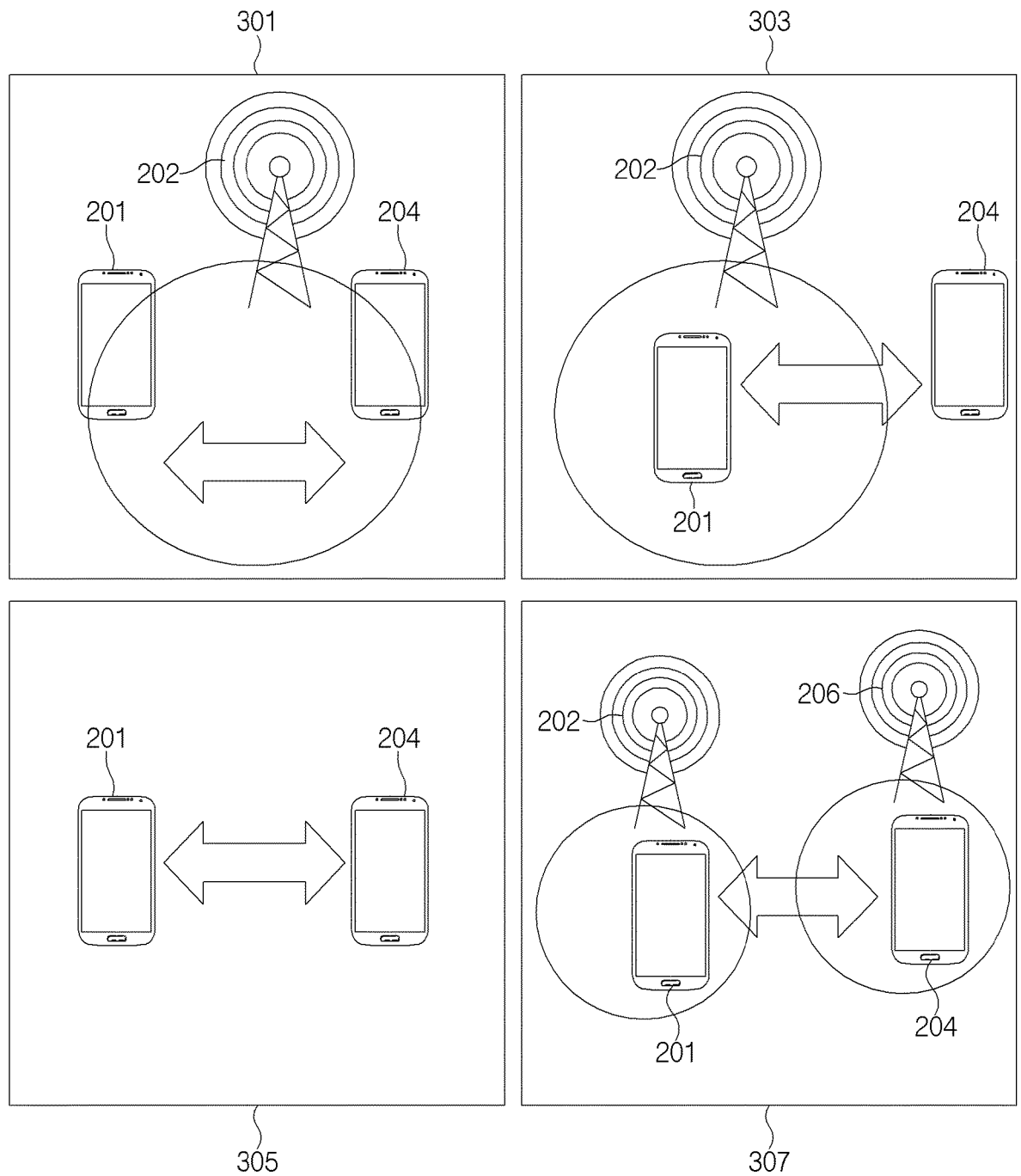
FIG. 3 illustrates various device-to-device communication environments according to an embodiment of the disclosure.

FIG. 3 illustrates various device-to-device communication environments according to an embodiment of the disclosure.

Referring to FIG. 3, a reference number 301, the electronic device 201 may perform device-to-device communication with the external electronic device 204 in a cell of the base station 202. For example, the cell of the base station 202 may support device-to-device communication. The electronic device 201 may receive resource information for device-to-device communication from the base station 202, and may perform device-to-device communication with the external electronic device 204 using the resource information. In this case, since a radio resource for device-to-device communication, which is allocated by the base station 202, is used, interference with other electronic devices which do not perform device-to-device communication may be minimized in the cell. For another example, the cell of the base station 202 may not support device-to-device communication. In this case, when the electronic device 201 performs device-to-device communication using radio resources of the cell used in the cell, the device-to-device communication of the electronic device 201 may cause interference with other electronic devices in the cell. In the case where the radio resources of the cell do not include a radio resource for device-to-device communication, the device-to-device communication of the electronic device 201 may not cause interference with other electronic devices in the cell.

Referring to reference number 303, the electronic device 201 may perform, in the cell of the base station 202, device-to-device communication with the external electronic device 204 outside the cell. As described above with regard to reference number 301, the electronic device 201 may perform device-to-device communication according to whether the cell of the base station 202 supports device-to-device communication. In an example, the electronic device 201 may also perform device-to-device communication with the external electronic device 204 via at least one relay device (not shown).

Referring to reference number 305, the electronic device 201 may perform device-to-device communication with the external electronic device 204 without camping on any cell. In this case, the electronic device 201 may not be located within coverage of any cell. Device-to-device communication performed outside the coverage of a cell may be referred to as out-of-coverage (OOC) device-to-device communication. In the case of reference number 305, since there is no cell adjacent to the electronic device 201, the electronic device 201 may perform device-to-device communication without causing interference with another cell. In an example, although the electronic device 201 is not connected to any cell, the electronic device 201 may be adjacent to at least one cell (not shown). According to an embodiment of the disclosure, the electronic device 201 may determine whether to perform device-to-device communication based on interference with an adjacent cell.

Referring to reference number 307, the electronic device 201 may be located within the cell of the base station 202, and the external electronic device 204 may be located within the cell of an adjacent base station 206. As described above with regard to reference number 301, the electronic device 201 may perform device-to-device communication by using or without using radio resources of the cell of the base station 202. According to an embodiment of the disclosure, the electronic device 201 may determine whether to perform device-to-device communication based on radio resource information about the cell of the adjacent base station 206 (hereinafter referred to as an adjacent cell). For example, even if the cell of the base station 202 supports device-to-device communication, the adjacent cell may set the corresponding radio resources as a barring band. In this case, the electronic device 201 may not perform device-to-device communication.

Figure 4:
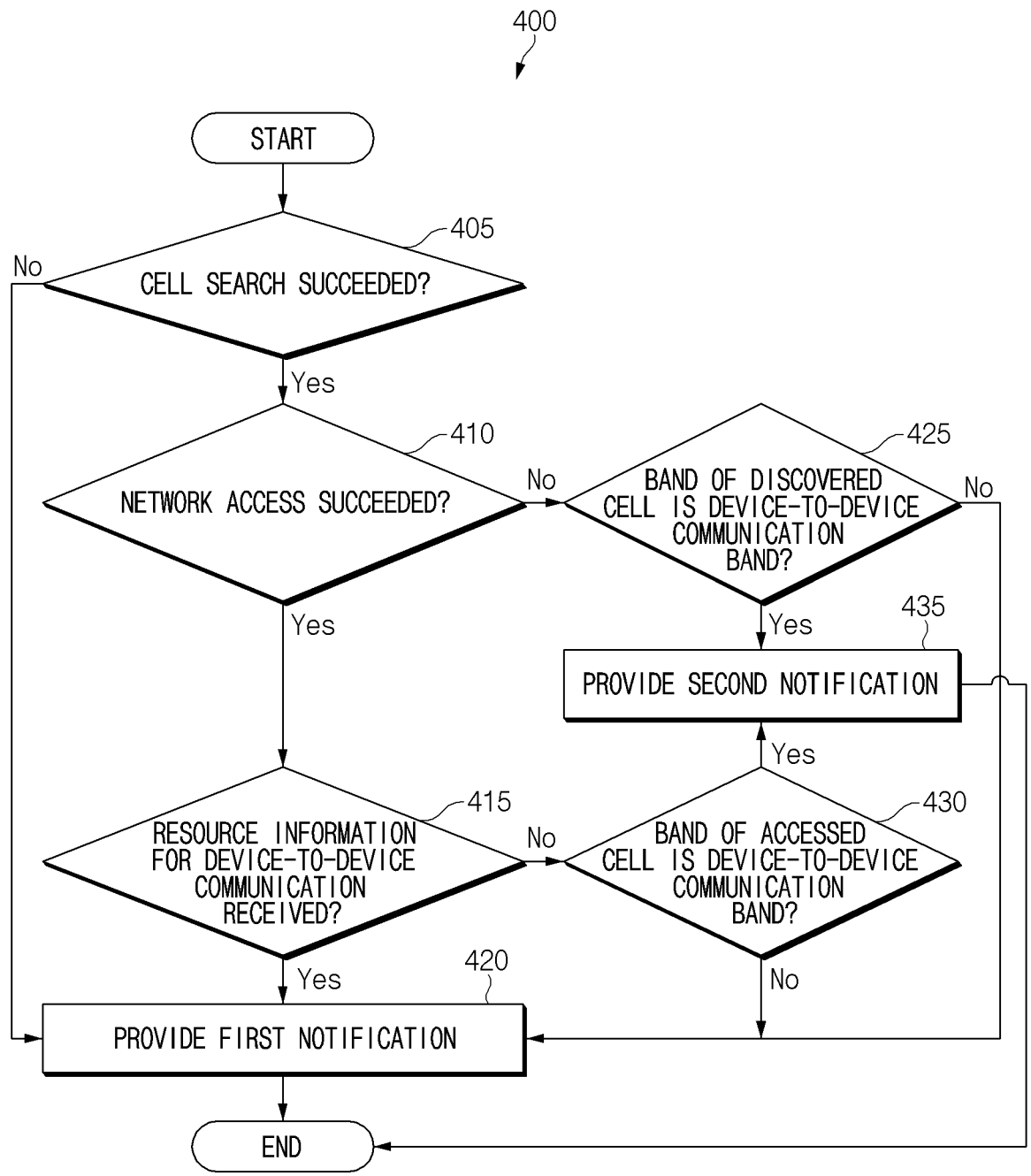
FIG. 4 is a flowchart illustrating a notification providing method according to an embodiment of the disclosure.

FIG. 4 is a flowchart 400 illustrating a notification providing method according to an embodiment of the disclosure.

Referring to FIG. 4, the notification providing method may be performed when the electronic device 201 attempts to access a network or activates a device-to-device communication function. For example, the electronic device 201 may attempt to access a network when powered on. The electronic device 201 may activate device-to-device communication based on a user's input or a setting of the electronic device 201.

At operation 405, the electronic device 201 may determine whether a cell search has succeeded. For example, when the electronic device 201 has not camped on any cell, the electronic device 201 may perform a cell search in order to select a cell. The electronic device 201 may search for a cell by receiving cell information broadcast from at least one cell. For example, the electronic device 201 may search for a cell by receiving system information broadcast from at least one cell. For example, the cell information may include a public land mobile network (PLMN) ID of a cell and radio access technology (RAT) information.

If a cell search fails (e.g., operation 405-N), the electronic device 201 may provide a first notification indicating that device-to-device communication is possible (e.g., ready) at operation 420. For example, the electronic device 201 may trigger a first event indicating that device-to-device communication is possible, and may provide the first notification based on triggering of the first event. The electronic device 201 may provide a visual, tactile, and/or auditory notification. The failure of a cell search may indicate that the electronic device 201 has also failed to receive any cell information (e.g., system information block). In this case, as described with regard to reference number 305 of FIG. 3, the electronic device 201 may be located in a place in which there is no surrounding cell. In this case, since device-to-device communication of the electronic device 201 may not cause interference with another electronic device, the electronic device 201 may determine that device-to-device communication is possible.

At operation 410, the electronic device 201 may determine whether access to a network has succeeded. If a cell search has succeeded (e.g., operation 405-Y), the electronic device 201 may select one cell for access using received cell information. For example, the electronic device 201 may select one cell based on received signal strength and/or RAT information about a cell. The electronic device 201 may attempt to access (e.g., attach) a selected cell (or network). The electronic device 201 may succeed in accessing a network by transmitting a signal for requesting access to the selected cell (or network) and receiving a successful response.

At operation 415, the electronic device 201 may determine whether resource information for device-to-device communication is received. When network access has succeeded (e.g., operation 410-Y), the electronic device 201 may determine whether the resource information for device-to-device communication is received from an accessed cell. For example, the resource information for device-to-device communication may be obtained from specified system resource block (e.g., SIB 18 and/or SIB 19). In the case where a cell supports device-to-device communication, the cell may transmit the resource information for device-to-device communication. If the resource information for device-to-device communication is not received from the cell, the electronic device 201 may determine that the accessed cell does not support device-to-device communication.

If the resource information for device-to-device communication is received (e.g., operation 415-Y), the electronic device 201 may provide the first notification indicating that device-to-device communication is possible according to operation 420. In the case where the accessed cell supports device-to-device communication, the electronic device 201 may perform device-to-device communication using a radio resource specified by the accessed cell.

If the resource information for device-to-device communication is not received (e.g., operation 415-N), the electronic device 201 may determine whether a band of the accessed cell corresponds to a band for device-to-device communication at operation 430. For example, if the band of the accessed cell includes an entirety or at least a portion of a band set for device-to-device communication, the electronic device 201 may determine that the band of the accessed cell corresponds to the band for device-to-device communication. The electronic device 201 may determine whether the band of the accessed cell corresponds to the band for device-to-device communication based on information (e.g., PLMN, PDN, and/or frequency band information) about the accessed cell.

If the band of the accessed cell corresponds to the band for device-to-device communication (e.g., operation 430-Y), the electronic device 201 may provide a second notification indicating that device-to-device communication is impossible (e.g., not-ready) at operation 435. For example, the electronic device 201 may trigger a second event indicating that device-to-device communication is impossible, and may provide the second notification based on triggering of the second event. The electronic device 201 may provide a visual, tactile, and/or auditory notification. If the accessed cell does not support device-to-device communication but uses the band for device-to-device communication, device-to-device communication performed by the electronic device 201 may cause interference with other electronic devices in the cell. In this case, the electronic device 201 may determine not to perform device-to-device communication.

If the band of the accessed cell does not correspond to the band for device-to-device communication (e.g., operation 430-N), the electronic device 201 may provide the first notification indicating that device-to-device communication is possible according to operation 420. Since the accessed cell does not use a radio resource for device-to-device communication, the electronic device 201 may determine to perform device-to-device communication.

If the electronic device 201 has succeeded in searching for a cell but has failed to access a network (e.g., operation 410-N), the electronic device 201 may determine whether a band of a discovered cell is a band for device-to-device communication at operation 425. The electronic device 201 may succeed in receiving system information about a cell in a location adjacent to the cell, but may fail to access the cell or may not attempt to access the cell for various reasons. For example, the electronic device 201 may not access the discovered cell when the discovered cell is a barring cell, when the discovered cell is unable to be accessed through subscriber information of the electronic device 201, when the RAT or reception strength of the discovered cell does not satisfy a condition of the electronic device 201, or when a network registration impossibility or failure message is received from a network for various reasons during a network access procedure.

According to an embodiment of the disclosure, the electronic device 201 may determine whether the band of the discovered cell is a band for device-to-device communication based on information (e.g., PLMN, PDN, and/or frequency band information) about the discovered cell. The electronic device 201 may determine whether the band of the discovered cell is a band for device-to-device communication by comparing a frequency band of the discovered cell with band information for device-to-device communication stored in a memory. The electronic device 201 may determine whether the band of the discovered cell is a band for device-to-device communication by comparing the PLMN (e.g., PLMN identifier) and/or packet data network (PDN) ID of the discovered cell with a value (e.g., device-to-device communication supporting PLMN and/or PDN information) stored in the memory.

When the band of the discovered cell includes a band set for device-to-device communication or includes at least a portion thereof (e.g., operation 425-Y), interference with the discovered cell may occur if the electronic device 201 performs device-to-device communication using the band set for device-to-device communication. At operation 435, the electronic device 201 may provide the second notification indicating that device-to-device communication is impossible. For example, the electronic device 201 may trigger a second event indicating that device-to-device communication is impossible, and may provide the second notification based on triggering of the second event. The electronic device 201 may provide a visual, tactile, and/or auditory notification.

If the band of the discovered cell does not include the band set for device-to-device communication (e.g., operation 425-N), the electronic device 201 may provide the first notification indicating that device-to-device communication is possible according to operation 420. Since the discovered cell does not use a radio resource for device-to-device communication, device-to-device communication performed by the electronic device 201 may not cause interference with adjacent cell.

In an example, the electronic device 201 may be configured to perform operation 420 when the electronic device 201 fails to access (e.g., operation 410-N). In this case, operation 425 may be skipped. For example, the electronic device 201 may be configured to activate device-to-device communication when an access failure occurs based on setting information (e.g., preference information) about the electronic device 201.

Operations performed by the electronic device 201 when the electronic device 201 is not connected (attached) to any cell have been described with reference to FIG. 4. Even when the electronic device 201 is connected (attached) to any cell, the electronic device 201 may perform similar operations. For example, the electronic device 201 may perform operations as described below. The electronic device 201 may perform at least a portion of the operations illustrated in FIG. 4 according to activation of device-to-device communication, execution of an application for device-to-device communication, and/or a preset period. For example, if the PLMN of a cell which is currently connected to the electronic device 201 is a specified PLMN (e.g., device-to-device communication supporting PLMN), the electronic device 201 may determine whether the currently connected cell supports device-to-device communication by performing operation 415.

With regard to FIG. 4, a method of determining whether to support device-to-device communication of the electronic device 201 connected to a cell which uses a band for device-to-device communication may be summarized as shown in following Table 1.

TABLE 1

| RAT | Serving cell band | Availability of device-to-device communication support by serving cell | Availability of device-to-device communication |
|---|---|---|---|
| LTE/5G | Including device-to-device communication band (e.g., LTE band 14) | SIB-18/19 supported SIB-18/19 non-supported | Available Unavailable |

Various embodiments in which the electronic device 201 determines whether device-to-device communication is available based on information about a cell and an adjacent cell have been described with reference to FIG. 4. The electronic device 201 according to embodiments of the disclosure may determine the availability of device-to-device communication further based on other information in addition to the above-described information. In the example of Table 1, the electronic device 201 may determine the availability of device-to-device communication as described below. For example, if a current serving cell of the electronic device 201 uses a frequency for device-to-device communication and provides SIB 18/19, and there is no barring cell for a frequency band for device-to-device communication, the electronic device 201 may determine that device-to-device communication is available. In this case, the electronic device 201 may provide in-coverage device-to-device communication.

For example, if the serving cell of the electronic device 201 does not provide SIB 18/19 while using a frequency band for device-to-device communication, the electronic device 201 may determine that device-to-device communication is unavailable.

For example, the electronic device 201 may determine the availability of device-to-device communication further based on additional system information, barring band information, and/or preference information. Although not described in Table 1, even if a discovered cell supports device-to-device communication, the electronic device 201 may determine that device-to-device communication is unavailable without attempting to access the cell when the cell is set as a barring cell in the electronic device 201.

The same method may be used to determine the availability of device-to-device communication not only for a current cellular technology, such as long term evolution (LTE) but also for a next generation communication environment, such as 5th generation (5G) mobile communication.

According to an embodiment of the disclosure, in the case where 5G mobile communication-based vehicle-to-everything (V2X) communication is supported, a cell may transmit specified additional system information (e.g., SIB 21 and/or SIB 26). The electronic device 201 which supports V2X may determine the availability of device-to-device communication when system information about V2X communication is received.

The electronic device 201 may determine the availability of device-to-device communication further based on barring cell information or a barring band of an adjacent cell. For example, even if a serving cell supports device-to-device communication, the electronic device 201 may determine that device-to-device communication is unavailable when an adjacent cell sets a band for device-to-device communication or a cell of the band as a barring band or a barring cell.

For example, in a serving cell which does not use a frequency for device-to-device communication, the electronic device 201 may determine the availability of device-to-device communication according to following Table 2.

TABLE 2

| Number | RAT | Serving cell band | Adjacent barring cell | Device-to-device communication Availability |
|---|---|---|---|---|
| 1 | LTE/3G/2G | Device-to-device communication non-supporting band | FALSE | Available |
| 2 | | Device-to-device communication non-supporting band | TRUE | Unavailable |
| 3 | Shadow area | Shadow area | N/A | Available |

In Table 2, the band of the adjacent cell (neighboring barring cell) may be a band (e.g., LTE band 14) for device-to-device communication. Therefore, when the adjacent cell of the band for device-to-device communication is set as a barring cell, the electronic device 201 may not perform device-to-device communication.

In case number 1 of Table 2, the serving cell uses a band that does not support device-to-device communication, and the adjacent cell which uses the band for device-to-device communication is not set as a barring cell. In this case, the electronic device 201 may determine that device-to-device communication is available. In case number 2 of Table 2, since the adjacent cell is set as a barring cell, the electronic device 201 may determine that device-to-device communication is unavailable. In case number 3 of Table 2, since both the serving cell and the adjacent cell are not detected, the electronic device 201 may determine that device-to-device communication is available. For example, if a current serving cell of a terminal does not use a frequency for device-to-device communication or the terminal is located in a shadow area, and there is no barring cell for a frequency band for device-to-device communication, the electronic device 201 may determine that device-to-device communication is available. In this case, the electronic device 201 may determine that OOC device-to-device communication is available. For example, if the electronic device 201 is in an OOC state (e.g., in the case of being present in a shadow area or connected to a serving cell which does not use a frequency band for device-to-device communication), and a barring cell for a frequency band for device-to-device communication is present among adjacent cells, the electronic device 201 may determine that device-to-device communication is unavailable.

According to an embodiment of the disclosure, the electronic device 201 may determine the availability of device-to-device communication further based on preference information. For example, the preference information may include priority information or information about preference between device-to-device communication and on-network communication. The preference information may be set by the user or a network provider. The on-network communication corresponds to the case of providing a service using a cellular communication network, and may correspond to wireless communication other than device-to-device communication. For example, in the case where the electronic device 201 is configured to perform device-to-device communication, on-network communication may be restricted for device-to-device communication contrary to user's intent. By further using the preference information, the electronic device 201 may provide device-to-device communication satisfying user's intent.

For example, the preference information may include an on-network only mode, an on-network preferred mode, a device-to-device communication preferred mode, and a device-to-device communication only mode. According to an embodiment of the disclosure, the electronic device 201 may provide a service based on the preference information and the availability of device-to-device communication as shown in following Table 3.

TABLE 3

| | Device-to-device communication available | | | Device-to-device communication unavailable |
|---|---|---|---|---|
| | In-coverage | OOC | | |
| Service | Device-to-device communication supporting cell | Device-to-device communication non-supporting cell | Shadow area | |
| On-network only mode | On-network service | On-network service | N/A | On-network service |
| On-network preferred mode | On-network service | On-network service | Device-to-device communication service | On-network service |
| Device-to-device communication preferred mode | Device-to-device communication service | Device-to-device communication service | Device-to-device communication service | On-network service |
| Device-to-device communication only mode | Device-to-device communication service | Device-to-device communication service | Device-to-device communication service | N/A |

For example, when the electronic device 201 is set to the on-network only mode, the electronic device 201 may not perform device-to-device communication even if the electronic device 201 is located in a shadow area. In the case of the on-network preferred mode, the electronic device 201 may perform device-to-device communication only in a shadow area.

For example, in the case of the device-to-device communication preferred mode, the electronic device 201 may perform an on-network service only when device-to-device communication is impossible. In the case of the device-to-device communication only mode, the electronic device 201 may also not provide an on-network service if device-to-device communication is impossible.

In an example, the electronic device 201 may simultaneously support an on-network service and device-to-device communication. When the electronic device 201 is in a state of in-coverage of a device-to-device communication supporting cell, the electronic device 201 may simultaneously support an on-network service and device-to-device communication.

By using the methods described above with reference to FIG. 4, the electronic device 201 may automatically determine the availability of device-to-device communication without a manual input from the user. Furthermore, the electronic device 201 may provide a notification based on the availability of device-to-device communication so as to enable the user to actively cope with a network situation.

Figure 5:
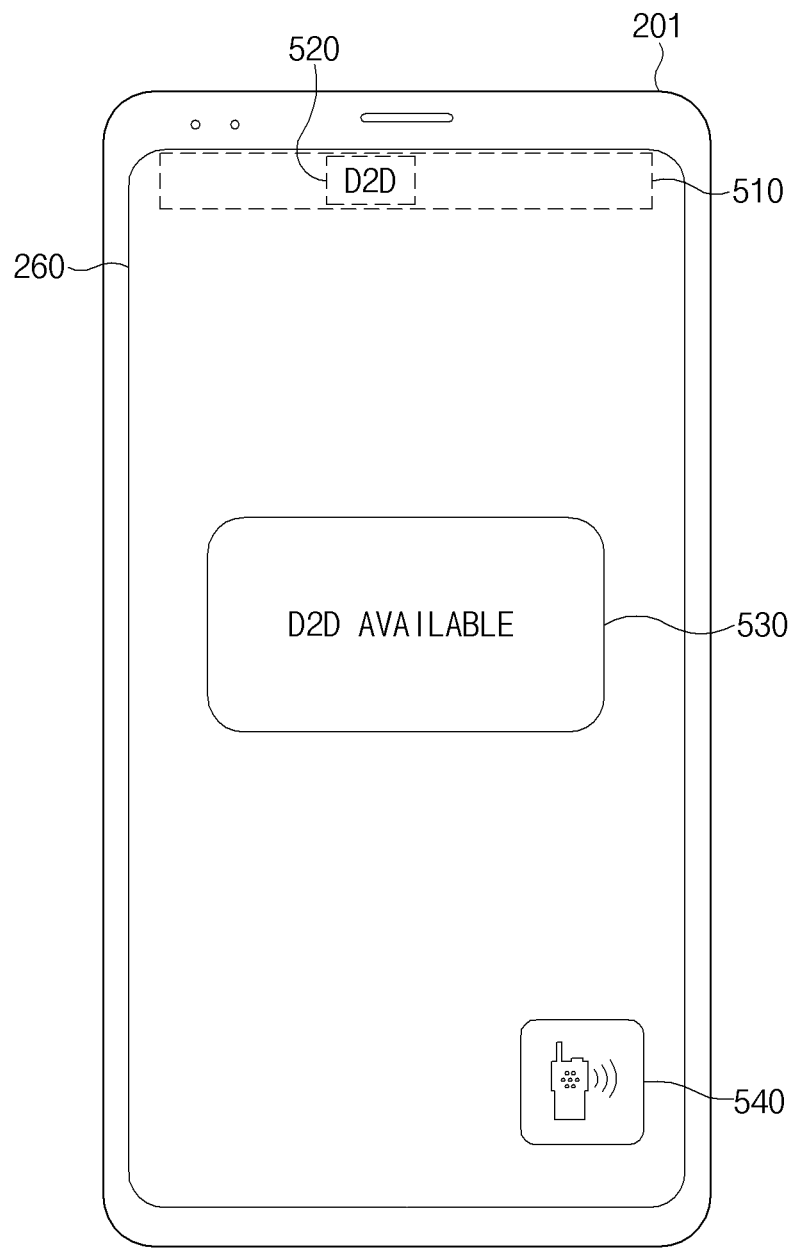
FIG. 5 illustrates a notification user interface (UI) according to an embodiment of the disclosure.

FIG. 5 illustrates a notification user interface (UI) according to an embodiment of the disclosure.

Referring to FIG. 5, the electronic device 201 may provide a first notification indicating that device-to-device communication is available. For example, the electronic device 201 may provide the first notification after the electronic device 201 is booted up, when executing an application of device-to-device communication, when the availability of device-to-device communication changes after executing an application of device-to-device communication, and/or when executing a device-to-device communication service (e.g., D2D discovery, D2D communication, and/or D2D relay). For example, the electronic device 201 may provide a tactile and/or auditory notification together with the visual notification described below with reference to FIG. 5.

Referring to FIG. 5, for example, the electronic device 201 may display, on a notification bar 510 of the touch display 260, an icon 520 indicating that device-to-device communication is available. For example, the notification bar 510 may be referred to as a state display window. For another example, the electronic device 201 may display a pop-up message 530 (e.g., a notification window) indicating that device-to-device communication is available. For another example, the electronic device 201 may display an application icon 540 of an application that supports device-to-device communication, or may display the application icon 540 in a first form. The electronic device 201 may provide the first notification by displaying the icon 520, the pop-up message 530, and/or the application icon 540. The icon 520, the pop-up message 530, and the application icon 540 of FIG. 5 are exemplary, and embodiments of the disclosure are not limited thereto.

According to an embodiment of the disclosure, the electronic device 201 may provide a second notification indicating that device-to-device communication is unavailable. For example, the electronic device 201 may provide the second notification after the electronic device 201 is booted up, when executing an application of device-to-device communication, and/or when the availability of device-to-device communication changes after executing an application of device-to-device communication.

For example, the electronic device 201 may stop displaying, on the notification bar 510 of the touch display 260, the icon 520 indicating that device-to-device communication is available. For another example, the electronic device 201 may stop displaying the application icon 540. For another example, the electronic device 201 may display the application icon 540 in a second form. For example, the second form may differ from the first form in at least one of color, shape, and/or size.

Figure 6:
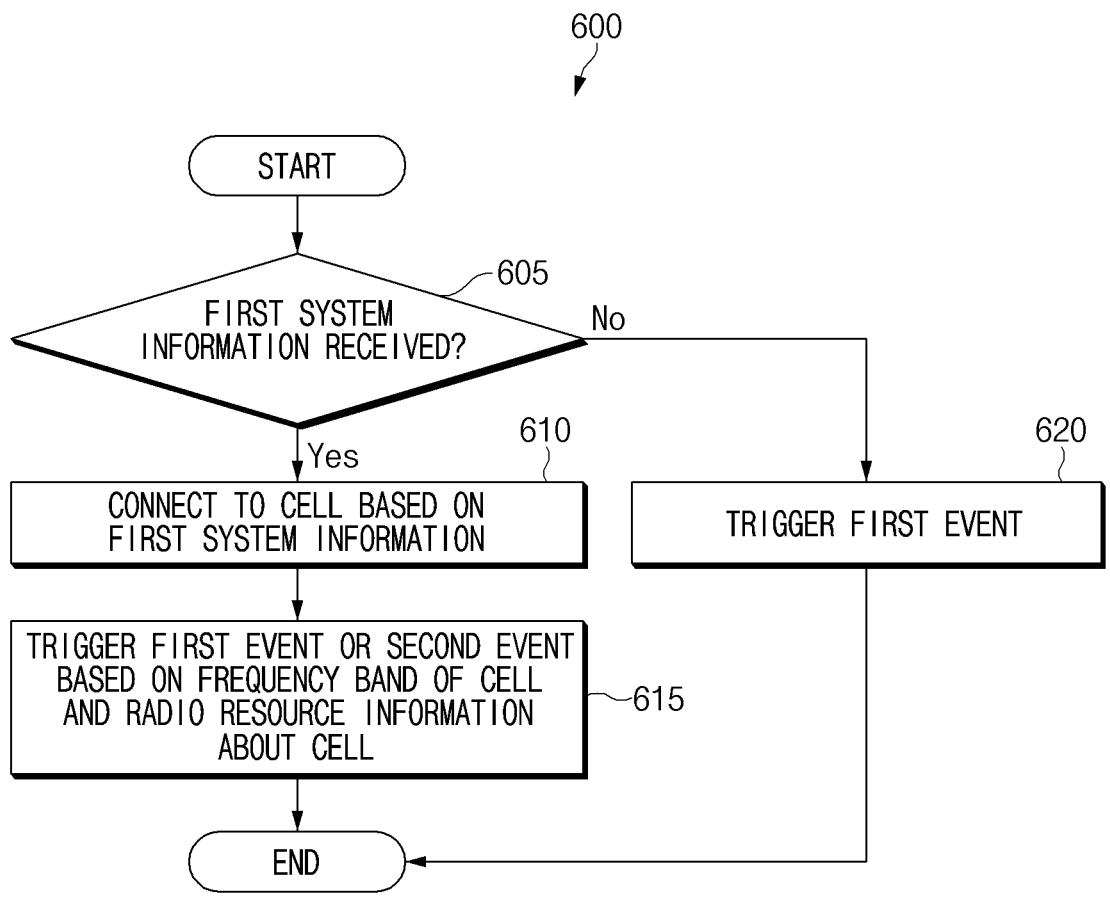
FIG. 6 is a flowchart illustrating a device-to-device communication providing method according to an embodiment of the disclosure.

FIG. 6 is a flowchart 600 illustrating a device-to-device communication providing method according to an embodiment of the disclosure.

Referring to FIG. 6, at operation 605, the electronic device 201 may determine whether first system information (e.g., master information block (MIB), system information block type 1 (SIB1) information) is received. For example, the electronic device 201 may be in a state of not being connected to any cell. The electronic device 201 may attempt to receive the first system information broadcast from a base station.

If the first system information is not received (e.g., operation 605-N), the electronic device 201 may trigger a first event indicating that device-to-device communication is possible at operation 620. For example, the electronic device 201 may provide the first notification based on triggering of the first event.

If the first system information is received (e.g., operation 605-Y), the electronic device 201 may be connected to a cell corresponding to the first system information based on the first system information at operation 610. For example, the electronic device 201 may access (e.g., attach) the cell using the first system information.

At operation 615, the electronic device 201 may trigger the first event indicating that device-to-device communication is possible or a second event indicating that device-to-device communication is impossible based on a frequency band of the cell and radio resource information about the cell. For example, the electronic device 201 may trigger the first event if the frequency band of the cell includes a frequency band for device-to-device communication, and the radio resource information about the cell supports device-to-device communication. If second system information (e.g., SIB 18 and/or SIB 19) for device-to-device communication is received from the cell, the electronic device 201 may determine that the radio resource information about the cell supports device-to-device communication. The electronic device 201 may trigger the second event if the frequency band of the cell includes a frequency band for device-to-device communication, and the radio resource information about the cell does not support device-to-device communication.

According to an embodiment of the disclosure, the electronic device 201 may receive third system information about an adjacent cell. For example, the third system information may include barring cell information. The electronic device 201 may trigger the first event or the second event based on the third system information. For example, if the third system information indicates that the frequency band for device-to-device communication is a barring band, the electronic device 201 may trigger the second event.

According to an embodiment of the disclosure, based on the frequency band of a cell and the radio resource information about a cell and further based on preference information stored in a memory, the electronic device 201 may provide a device-to-device communication service based on the preference information stored in the memory and setting information for triggering the first event or the second event.

For example, the preference information may include preference information about device-to-device communication.

According to an embodiment of the disclosure, the electronic device 201 may display a graphic object indicating that device-to-device communication is possible on the display in response to triggering of the first event.

According to various embodiments of the disclosure, an electronic device may determine whether to support device-to-device communication.

Furthermore, an electronic device may improve user convenience by providing, in real time, information indicating whether device-to-device communication is supported.

An electronic device may reduce malfunction by configuring a communication circuit according to whether device-to-device communication is supported.

The electronic device may perform an operation that satisfies user's intent by determining whether to support device-to-device communication according to user preference.

Besides, various effects may be provided that are directly or indirectly identified through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile communication device comprising:
   a display;
   a communication circuit;
   a memory; and
   a processor operatively connected to the display, the communication circuit, and the memory,
   wherein the processor is configured to:
      receive first system information broadcast from a base station using the communication circuit,
      receive third system information about an adjacent cell that is adjacent to the cell using the communication circuit,
      connect to a cell associated with the base station based on the first system information using the communication circuit,
      trigger, based on a frequency band of the cell and radio resource information about the cell, a first event indicating that device-to-device communication is possible or a second event indicating that the device-to-device communication is impossible, and
      trigger the second event when the third system information indicates that the frequency band for the device-to-device communication is a barring band.

2. The mobile communication device of claim 1, wherein the processor is further configured to trigger the first event when the frequency band of the cell includes a frequency band for the device-to-device communication and the radio resource information about the cell supports the device-to-device communication.

3. The mobile communication device of claim 2, wherein the processor is further configured to determine that the radio resource information about the cell supports the device-to-device communication when second system information for the device-to-device communication is received from the cell.

4. The mobile communication device of claim 3, wherein the second system information includes system information block 18 or system information block 19.

5. The mobile communication device of claim 1,
   wherein the processor is further configured to trigger the second event when the frequency band of the cell includes a frequency band for the device-to-device communication, and
   wherein the radio resource information about the cell does not support the device-to-device communication.

6. The mobile communication device of claim 1, wherein the processor is further configured to trigger the first event when reception of the first system information fails in a state of not being connected to any cell.

7. The mobile communication device of claim 1,
   wherein the processor is further configured to trigger the first event or the second event further based on the frequency band of the cell, the radio resource information about the cell, and preference information stored in the memory, and
   wherein the preference information includes preference information about the device-to-device communication.

8. The mobile communication device of claim 1, wherein the processor is further configured to display, on the display, a graphic object indicating that the device-to-device communication is possible in response to triggering of the first event.

9. A method for providing device-to-device communication of a mobile communication device, the method comprising:
   attempting to receive first system information broadcast from a base station;
   connecting to a cell associated with the base station based on the first system information when the first system information is received;
   triggering, based on a frequency band of the cell and radio resource information about the cell, a first event indicating that device-to-device communication is possible or a second event indicating that the device-to-device communication is impossible;
   receiving third system information about an adjacent cell that is adjacent to the cell; and
   triggering the second event when the third system information indicates that the frequency band for the device-to-device communication is a barring band.

10. The method of claim 9,
    wherein the triggering of the first event or the second event comprises triggering the first event when the frequency band of the cell includes a frequency band for the device-to-device communication, and
    wherein the radio resource information about the cell supports the device-to-device communication.

11. The method of claim 10, wherein the triggering of the first event comprises determining that the radio resource information about the cell supports the device-to-device communication when second system information for the device-to-device communication is received from the cell.

12. The method of claim 11, wherein the second system information includes system information block 18 or system information block 19.

13. The method of claim 9,
    wherein the triggering of the first event or the second event comprises triggering the second event when the frequency band of the cell includes a frequency band for the device-to-device communication, and
    wherein the radio resource information about the cell does not support the device-to-device communication.

14. The method of claim 9, further comprising triggering the first event when reception of the first system information fails.

15. The method of claim 9,
    wherein the triggering of the first event or the second event comprises triggering the first event or the second event further based on the frequency band of the cell, the radio resource information about the cell, and preference information stored in a memory, and wherein the preference information includes preference information about the device-to-device communication.

16. The method of claim 9, further comprising displaying, on a display of the mobile communication device, a graphic object indicating that the device-to-device communication is possible in response to triggering of the first event.

\* \* \* \* \*